US012662209B2

(12) United States Patent
Chimento et al.

(10) Patent No.: US 12,662,209 B2
(45) Date of Patent: Jun. 23, 2026

(54) VEHICLE TAILGATE SYSTEM

(71) Applicant: Ford Global Technologies, LLC, Dearborn, MI (US)

(72) Inventors: Vincent A. Chimento, Plymouth, MI (US); Shawn Michael Morgans, Chelsea, MI (US); Jack Marchlewski, Smithville, MO (US); David Alan Hamilton, Howell, MI (US); Michael M. Azzouz, Farmington, MI (US); Jay John Meyer, Howell, MI (US); Scott Nydam, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 384 days.

(21) Appl. No.: 18/451,196

(22) Filed: Aug. 17, 2023

(65) Prior Publication Data

US 2025/0058844 A1 Feb. 20, 2025

(51) Int. Cl.

| | |
|---|---|
| *B62D 33/03* | (2006.01) |
| *B62D 27/02* | (2006.01) |
| *B62D 33/027* | (2006.01) |
| *B62D 33/037* | (2006.01) |
| *B62D 65/02* | (2006.01) |

(52) U.S. Cl.
CPC ......... *B62D 65/024* (2013.01); *B62D 27/026* (2013.01); *B62D 33/0273* (2013.01); *B62D 33/03* (2013.01); *B62D 33/037* (2013.01)

(58) Field of Classification Search
CPC .. B62D 33/0273; B62D 33/03; B62D 65/024; B62D 65/06
See application file for complete search history.

(56) References Cited

U.S. PATENT DOCUMENTS

| | | | | |
|---|---|---|---|---|
| 5,372,397 | A * | 12/1994 | Arndt ................... | B62D 29/001 296/57.1 |
| 5,944,373 | A * | 8/1999 | Seksaria ............ | B62D 33/0273 49/501 |
| 5,947,540 | A * | 9/1999 | Pariseau .............. | B62D 33/023 296/57.1 |
| 6,672,642 | B1 * | 1/2004 | Seksaria ............ | B62D 33/0273 296/50 |
| 6,676,187 | B1 * | 1/2004 | Miskech ............ | B62D 33/0273 49/501 |
| 7,213,859 | B1 * | 5/2007 | Tan ....................... | B62D 33/037 296/57.1 |
| 8,979,161 | B2 * | 3/2015 | Patterson ............... | B60J 5/0463 296/50 |
| 9,573,630 | B2 | 2/2017 | Gray et al. | |
| 9,623,803 | B1 * | 4/2017 | Martins .................... | B60R 3/02 |
| 9,789,914 | B1 * | 10/2017 | Maranville ........ | B62D 33/0273 |

(Continued)

FOREIGN PATENT DOCUMENTS

| | | |
|---|---|---|
| WO | 2020164842 A1 | 8/2020 |
| WO | 2021071841 A1 | 4/2021 |

*Primary Examiner* — Gregory A Blankenship
(74) *Attorney, Agent, or Firm* — Vichit Chea; Carlson, Gaskey & Olds, P.C.

(57) ABSTRACT

A method may secure a tailgate panel to a panel-carrying frame. A method may after securing the tailgate panel to the panel-carrying frame, secure a component-carrying frame to the panel-carrying frame. A method may after securing the component-carrying frame to the panel-carrying frame, secure one or more tailgate components to the component-carrying frame.

20 Claims, 7 Drawing Sheets

(56)      References Cited

U.S. PATENT DOCUMENTS

| | | | |
|---|---|---|---|
| 10,926,812 B2 | 2/2021 | Ukra et al. | |
| 11,198,477 B2 | 12/2021 | Coudron | |
| 2003/0155066 A1* | 8/2003 | Roehr | B62D 29/043 |
| | | | 156/245 |
| 2004/0084925 A1* | 5/2004 | Ojanen | B62D 29/008 |
| | | | 296/50 |
| 2004/0164580 A1* | 8/2004 | Armstrong | B62D 33/023 |
| | | | 296/50 |
| 2006/0082180 A1* | 4/2006 | Bruford | B60R 3/02 |
| | | | 296/50 |
| 2007/0090662 A1* | 4/2007 | Katterloher | B62D 33/023 |
| | | | 296/57.1 |
| 2007/0236038 A1* | 10/2007 | Firzlaff | B62D 33/0273 |
| | | | 296/57.1 |
| 2018/0065689 A1* | 3/2018 | Reiners | B62D 33/0273 |
| 2018/0119474 A1* | 5/2018 | Singh | E05F 5/00 |
| 2020/0247483 A1* | 8/2020 | Ukra | B62D 33/0273 |
| 2024/0278734 A1* | 8/2024 | Robertson, Jr. | B60R 11/04 |
| 2025/0058844 A1* | 2/2025 | Chimento | B62D 65/024 |

* cited by examiner

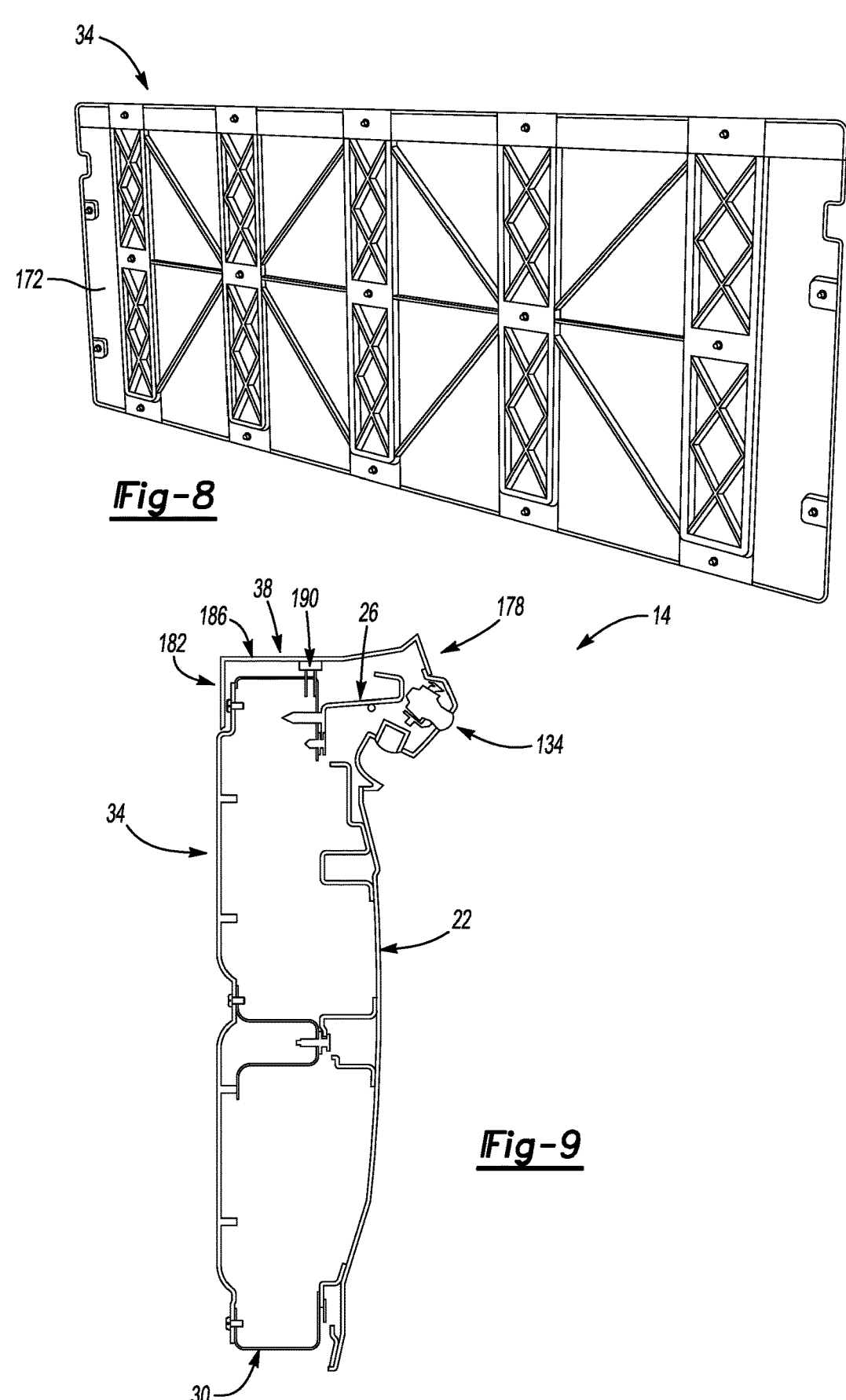
_Fig-8_
_Fig-9_

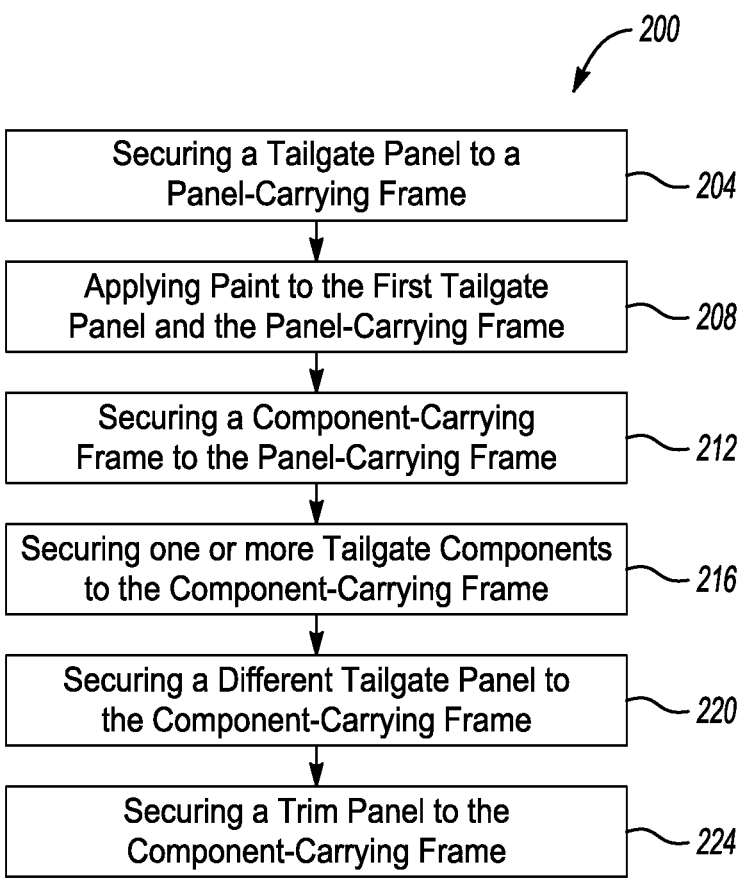

200

Securing a Tailgate Panel to a
Panel-Carrying Frame — 204

Applying Paint to the First Tailgate
Panel and the Panel-Carrying Frame — 208

Securing a Component-Carrying
Frame to the Panel-Carrying Frame — 212

Securing one or more Tailgate Components
to the Component-Carrying Frame — 216

Securing a Different Tailgate Panel to
the Component-Carrying Frame — 220

Securing a Trim Panel to the
Component-Carrying Frame — 224

*Fig-10*

VEHICLE TAILGATE SYSTEM

TECHNICAL FIELD

This disclosure relates generally to tailgate systems for vehicles and, more particularly, to facilitating assembly of tailgate systems.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable to an open position to provide access to the cargo bed.

SUMMARY

In some aspects, the techniques described herein relate to a tailgate system assembling method, including: securing a tailgate panel to a panel-carrying frame; after securing the tailgate panel to the panel-carrying frame, securing a component-carrying frame to the panel-carrying frame; and after securing the component-carrying frame to the panel-carrying frame, securing one or more tailgate components to the component-carrying frame.

In some aspects, the techniques described herein relate to a tailgate system assembling method, wherein securing the tailgate panel to the panel-carrying frame includes adhesively bonding the tailgate panel to the panel-carrying frame.

In some aspects, the techniques described herein relate to a tailgate system assembling method, further including painting the tailgate panel, the panel-carrying frame, or both before securing the panel-carrying frame to the component-carrying frame.

In some aspects, the techniques described herein relate to a tailgate system assembling method, further including securing the component-carrying frame to the panel-carrying frame using a plurality of fasteners.

In some aspects, the techniques described herein relate to a tailgate system assembling method, further including securing the component-carrying frame to the panel-carrying frame without painting the component-carrying frame.

In some aspects, the techniques described herein relate to a tailgate system assembling method, wherein the tailgate components are unpainted.

In some aspects, the techniques described herein relate to a tailgate system assembling method, further including, when securing the tailgate components to the component-carrying frame, accessing the tailgate components through an access opening in the tailgate panel, an access opening in the panel-carrying frame, an access opening in the component-carrying frame, and any combination thereof.

In some aspects, the techniques described herein relate to a tailgate system assembling method, wherein the tailgate panel is a first tailgate panel and further including, applying paint to a second tailgate panel and then securing the second tailgate panel to the component-carrying frame.

In some aspects, the techniques described herein relate to a tailgate system assembling method, further including, after securing the second tailgate panel to the component-carrying frame, securing a trim panel to the component-carrying frame.

In some aspects, the techniques described herein relate to a tailgate system assembling method, wherein the panel-carrying frame includes a first side and a second side, the tailgate panel secured to the first side, the component-carrying frame secured to the second side.

In some aspects, the techniques described herein relate to a tailgate system, including: a tailgate panel; a component-carrying frame; and a panel-carrying frame having a first side and a second side that is opposite the first side, the tailgate panel directly connected to the first side, the component-carrying frame directly connected to the second side.

In some aspects, the techniques described herein relate to a tailgate system, wherein the first side interfaces directly with the tailgate panel and the second side interfaces directly with the component-carrying frame.

In some aspects, the techniques described herein relate to a tailgate system, wherein the tailgate panel and the panel-carrier frame are painted, wherein the component-carrying frame is unpainted.

In some aspects, the techniques described herein relate to a tailgate system, further including a plurality of tailgate components that are supported on the component-carrying frame.

In some aspects, the techniques described herein relate to a tailgate system, wherein the plurality of tailgate components includes a tailgate motor, a torsion rod, a trailer tow module, a step ladder cartridge, a handle assembly, a camera, electrical wiring, sensors, latches, hinges, tailgate cables, and any combination thereof.

In some aspects, the techniques described herein relate to a tailgate system, wherein the component-carrying frame includes opposed sidewalls that extend between a top wall and a bottom wall, and a cross-member that extends laterally between the opposed sidewalls.

In some aspects, the techniques described herein relate to a tailgate system, wherein each of the opposed sidewalls, the top wall, the bottom wall, and the cross-member include a generally U-shaped channel for receiving tailgate components.

In some aspects, the techniques described herein relate to a tailgate system, wherein the top wall is secured to a trim panel.

In some aspects, the techniques described herein relate to a tailgate system, wherein the panel-carrying frame is sandwiched between the tailgate panel and the component-carrying frame.

In some aspects, the techniques described herein relate to a tailgate system, wherein the tailgate panel is an outer panel.

BRIEF DESCRIPTION OF THE FIGURES

The various features and advantages of the disclosed examples will become apparent to those skilled in the art from the detailed description. The figures that accompany the detailed description can be briefly described as follows:

FIG. 8 illustrates a tailgate panel from the tailgate system of FIG. 2.

FIG. 9 is a cross-sectional view taken along line 8-8 in FIG. 2.

FIG. 10 shows the flow of an exemplary tailgate system assembling method.

DETAILED DESCRIPTION

This disclosure relates generally to tailgate systems and to methods of assembling the tailgate systems. In an example, a tailgate system includes a first tailgate panel, a panel-carrying frame that is secured to the first tailgate panel, and a component-carrying frame that is secured to the panel-carrying frame. Tailgate components can be secured to the component-carrying frame without painting the tailgate components. These and other features are discussed in greater detail in the following paragraphs of this detailed description.

Figure 1:
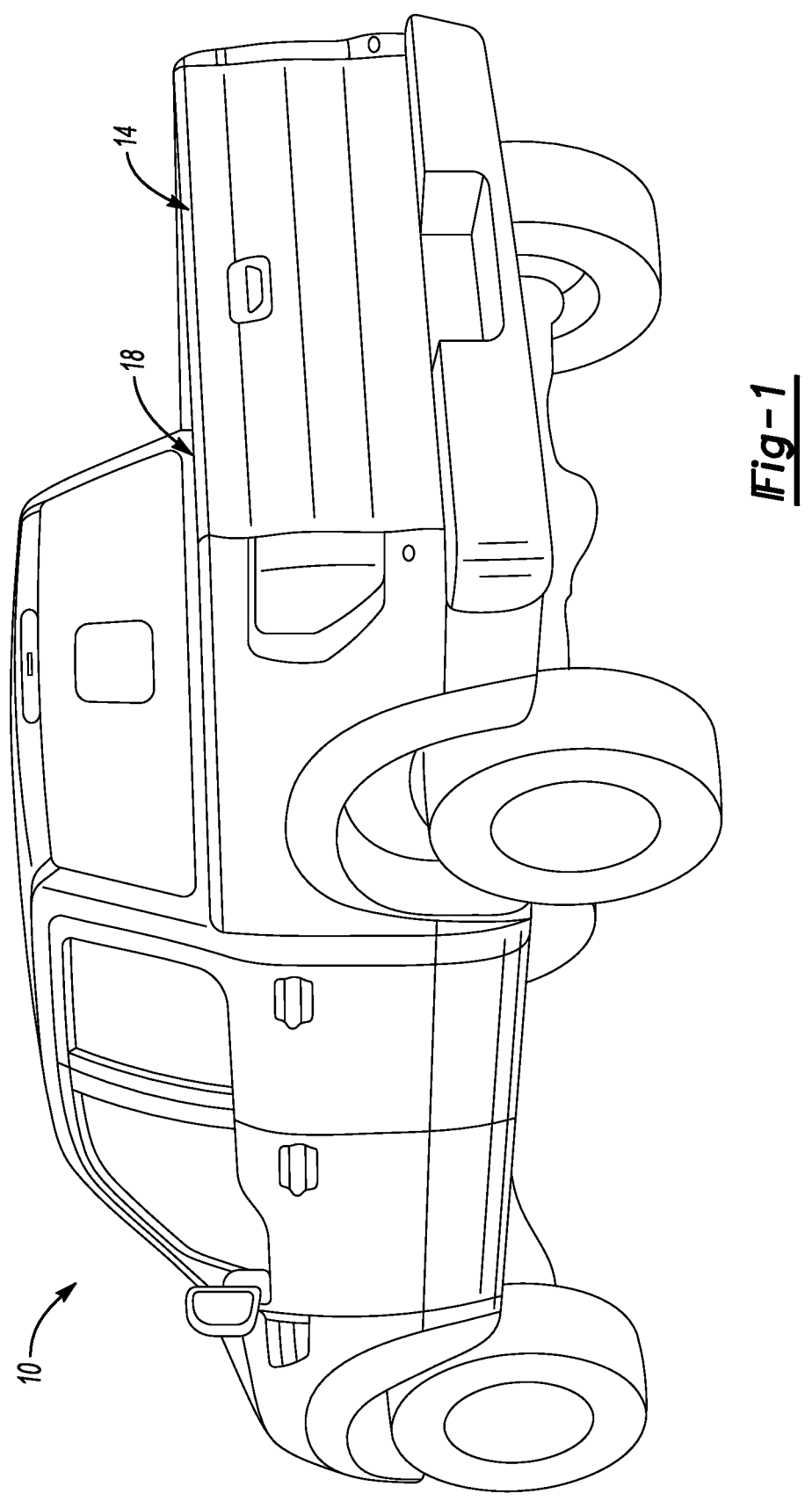
FIG. 1 is a rear perspective view of a motor vehicle equipped with a cargo space and having a tailgate system in a tailgate closed position relative to the cargo space.
Figure 2:
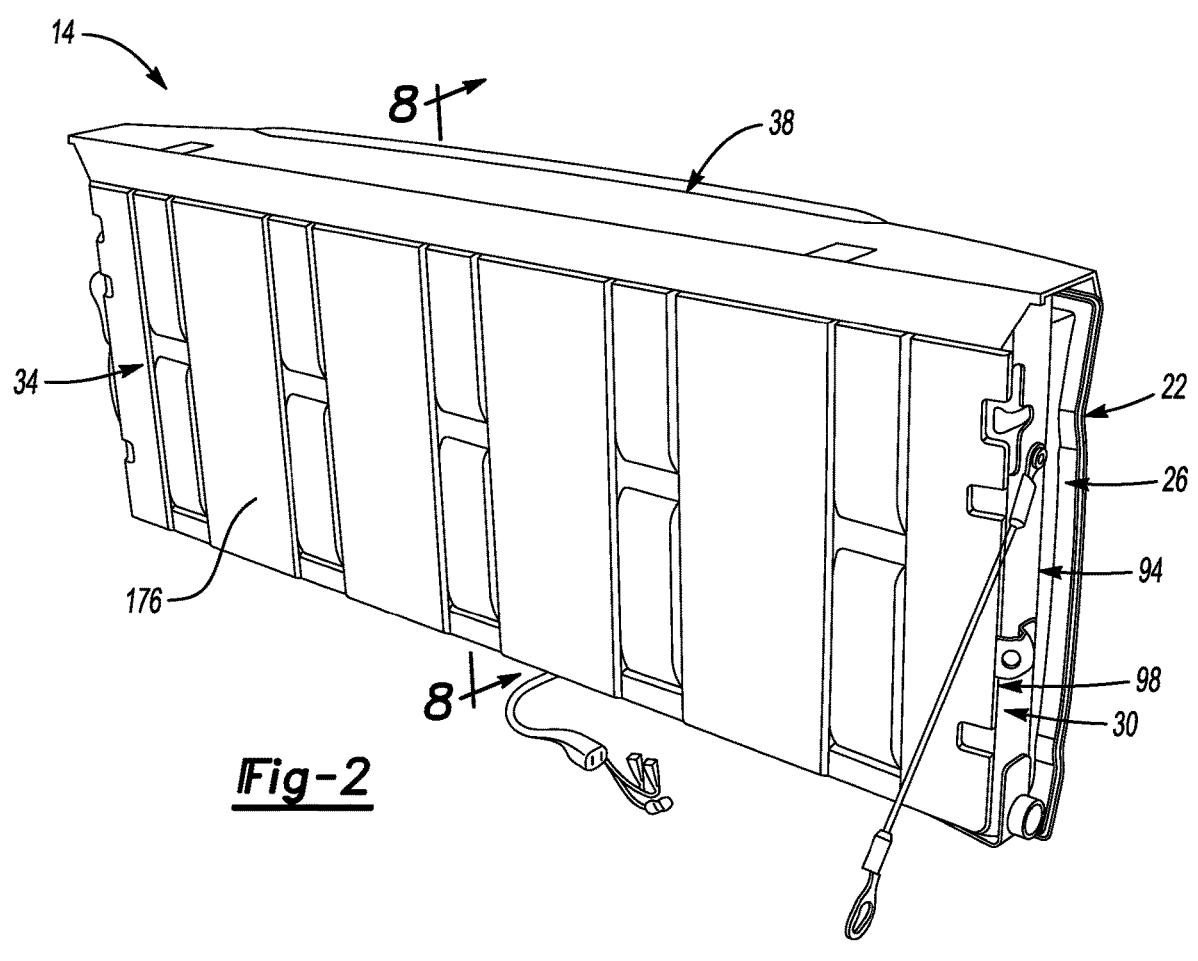
FIG. 2 illustrates a perspective view of the tailgate system from the vehicle of FIG. 1 according to an exemplary aspect of the present disclosure.
Figure 3:
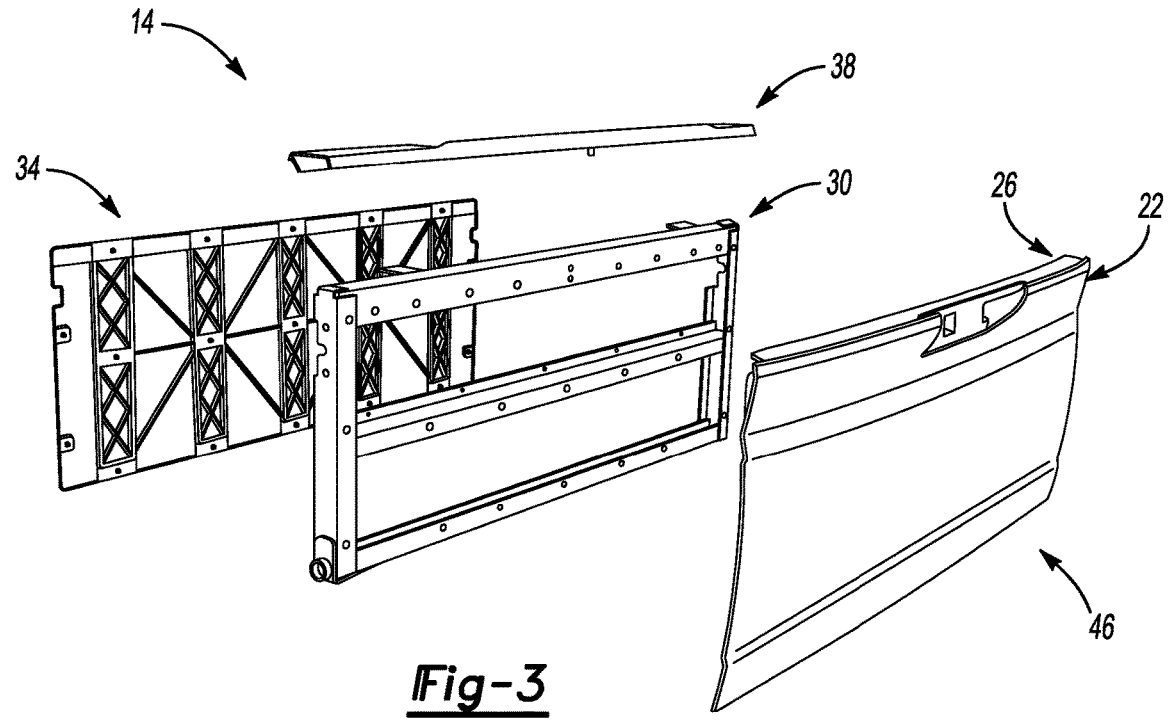
FIG. 3 is an expanded view of the tailgate system of FIG. 2.

With reference to FIG. 1, a vehicle 10 includes a tailgate system 14. As discussed further below, the tailgate system 14 includes features that facilitate assembly of the tailgate system 14.

The tailgate system 14 can move between a closed position as shown and an open position. When in the closed position, the tailgate system 14 encloses an aft end of a cargo bed 18. When in the open position, the tailgate system 14 permits users to access the cargo bed 18.

The tailgate system 14 is a type of vehicle closure module. In another example, the closure module could be a door, trunk lid, hood or any other type of closure module configuration.

Although a specific component relationship is illustrated in the figures of this disclosure, the illustrations are not intended to limit this disclosure. The placement and orientation of the various components of the vehicle 10 are shown schematically and could vary within the scope of this disclosure.

With reference to FIGS. 2-9, the example tailgate system 14 includes a first tailgate panel 22, a panel-carrying frame 26, a component-carrying frame 30, a second tailgate panel 34, and a trim panel 38. In the exemplary embodiment, the panel-carrying frame 26 is sandwiched between the first tailgate panel 22 and the component-carrying frame 30. Further, the component-carrying frame 30 is sandwiched between the panel-carrying frame 26 and the second tailgate panel 34. The trim panel 38 extends over the first tailgate panel 22, the panel-carrying frame 26, the component-carrying frame 30, and the second tailgate panel 34.

In one example, sides of the tailgate system 14 are exposed such that when the tailgate system 14 is in the open position, the panel-carrying frame 26 and the component-carrying frame 30 are visible. In another example, the sides of the tailgate system 14 are covered so that the panel-carrying frame 26 and the component-carrying frame 30 are not visible when the tailgate system 14 is in the open position.

During assembly of the tailgate system 14, the first tailgate panel 22 is secured directly to the panel-carrying frame 26 to form a tailgate panel sub-assembly 46. The first tailgate panel 22 and the panel-carrying frame 26 are secured using an adhesive 50 in this example. The first tailgate panel 22 includes an access opening 54 for accessing a handle assembly 134 (sec FIGS. 6 and 9) that can be actuated to open and close the tailgate system 14.

The first tailgate panel 22 is an outer panel in this example that forms an outer contour of the tailgate system 14. The first tailgate panel 22 may be made of a polymer-based material or metal material. Some possible example metals include aluminum and steel.

The panel-carrying frame 26 includes a first side 58 that interfaces directly with the first tailgate panel 22 and a second side 62 that interfaces directly with the component-carrying frame 30. The first side 58 is secured directly to the first tailgate panel 22. The second side 62 is secured directly to the component-carrying frame 30 by fasteners 66 that pass through apertures formed in the panel-carrying frame 26.

The panel-carrying frame 26 includes access openings 84, which can provide access to secure tailgate components. In this example, a bracket 86 that spans across one of the access openings 84, and the bracket 86 includes one or more openings 90 for securing tailgate components to the panel-carrying frame 26.

The panel-carrying frame 26 may be made of a polymer-based material or metal material. Some possible example metals include aluminum and steel.

The first tailgate panel 22 and the panel-carrying frame 26 may be painted using a powder or spray to decorate the appearance of the tailgate system 14. The first tailgate panel 22 and the panel-carrying frame 26 can be painted together after securing the panel-carrying frame 26 to the first tailgate panel 22. Alternatively, the first tailgate panel 22 and the panel-carrying frame 26 can be painted separately before securing the panel-carrying frame 26 to the first tailgate panel 22.

In the assembled tailgate system 14, the component-carrying frame 30 is directly secured on a first side 94 to the panel-carrying frame 26 and is directly secured on a second side 98 to the second tailgate panel 34.

The component-carrying frame 30 includes opposed sidewalls 102 that extend between a top wall 106 and a bottom wall 110, and a cross-member 114 that extends laterally between the opposed sidewalls 102. The opposed sidewalls 102, the top wall 106, the bottom wall 110, and the cross-member 114 generally have a U-shaped cross-section.

The cross-member 114 includes a pair of flanges 118 that are secured to one side of the opposed sidewalls 102 and a face portion 122 that is secured to a different, opposite side of the opposed sidewalls 102. The top wall 106, the bottom wall 110, and the face portion 122 of the cross-member 114 include apertures 126 for receiving the fasteners 66 (see FIG. 5) and securing the component-carrying frame 30 to the panel-carrying frame 26. The face portion 122 of the cross-member 114 is secured to the panel-carrying frame 26 at a location that is between the flanges 118.

The example component-carrying frame 30 is made of a metal material. Some possible example metals include aluminum and steel.

Figure 7A:
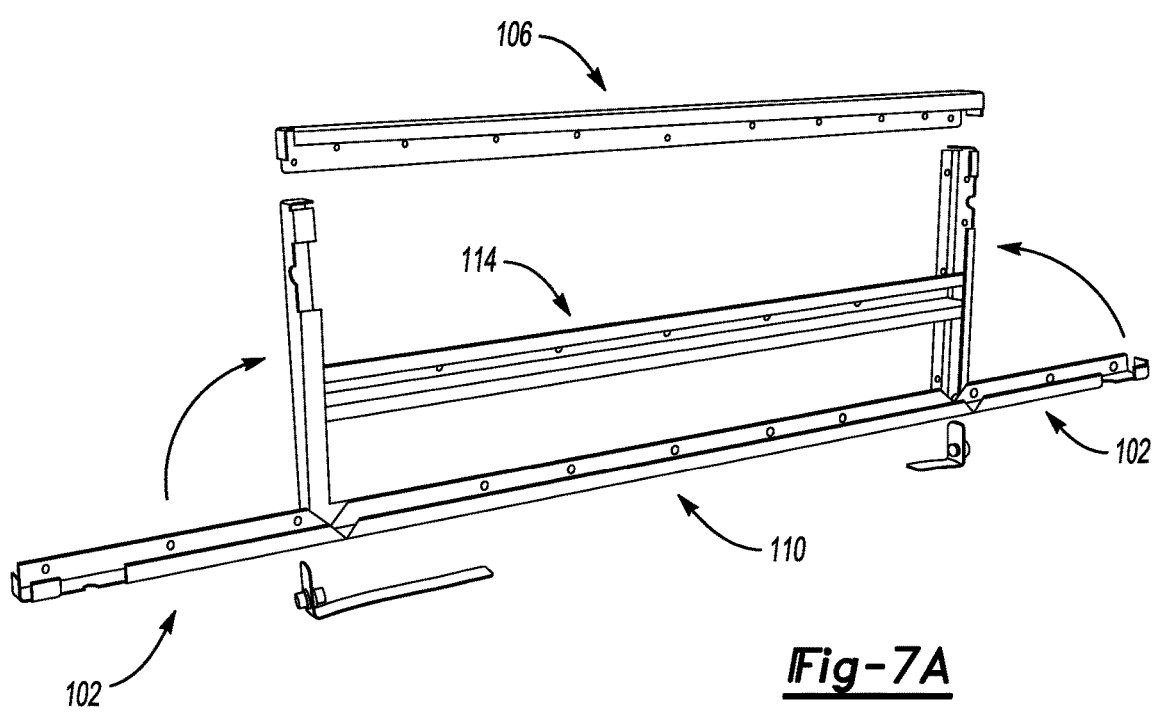
FIG. 7A is an expanded view of a component-carrying frame according to another exemplary embodiment.

In the example of FIG. 7A, a sheet of material is roll formed and then bent to provide the opposed sidewalls 102 and the bottom wall 110. The top wall 106 and the cross-member 114 are secured (bolted, welded, adhered, etc.) to the opposed sidewalls 102 to form a substantially three-piece component-carrying frame.

5

6

Figure 7B:
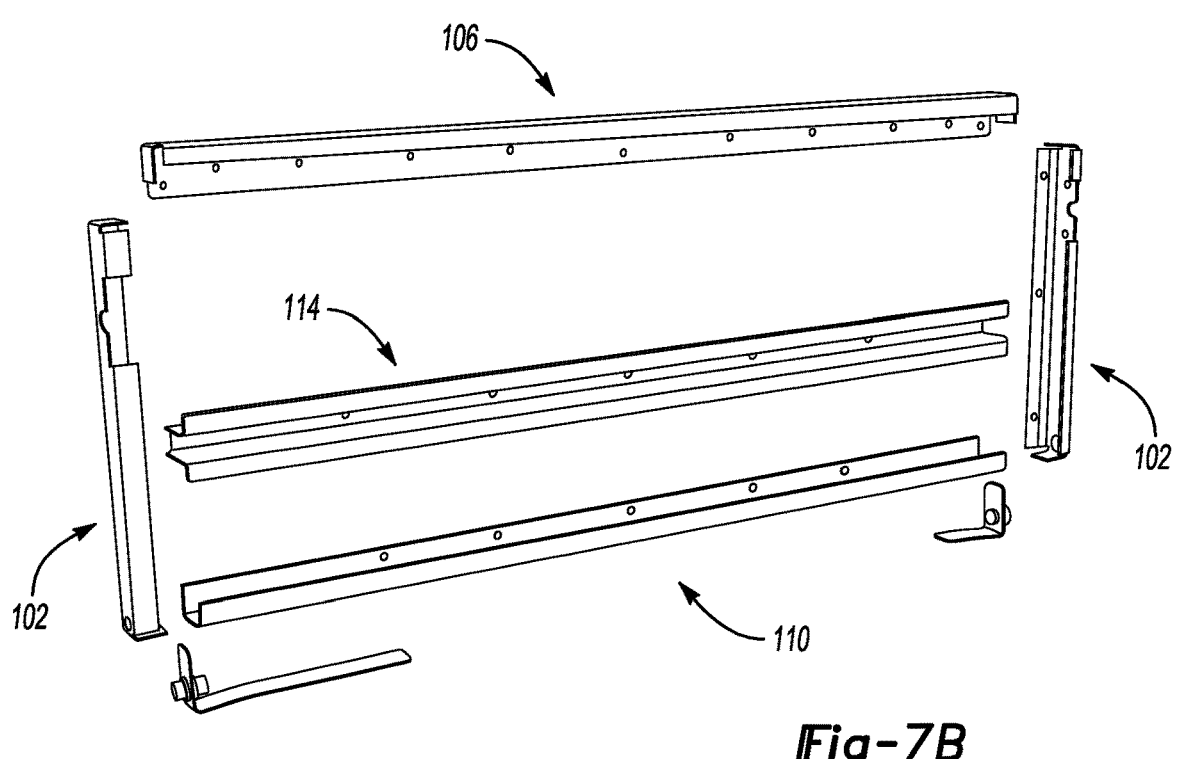
FIG. 7B is an expanded view of a component-carrying frame according to yet another exemplary embodiment.

In the example of FIG. 7B, the opposed sidewalls 102, the top wall 106, the bottom wall 110, and the cross-member 114 are separate pieces that are secured (bolted, welded, adhered, etc.) together to form a component-carrying frame.

Figure 7C:
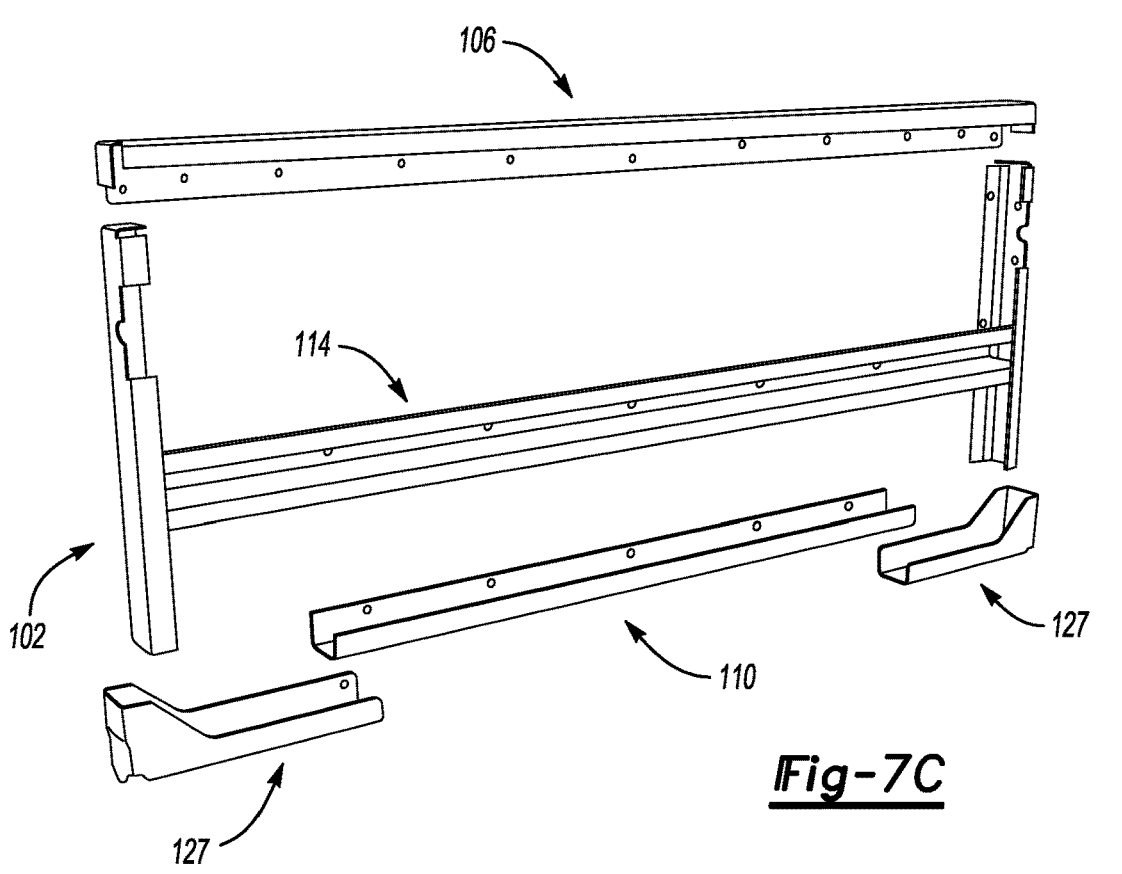
FIG. 7C is an expanded view of a component-carrying frame according to still another exemplary embodiment.

In the example of FIG. 7C, the component-carrying frame incorporates lower corner portions or hinge portions 127. The hinge portions 127 can be secured (bolted, welded, adhered, etc.) to the opposed sidewalls 102 and the bottom wall 110 to form a component-carrying frame.

The component-carrying frame 30 can be electrocoated or "e-coated" prior to securing the panel-carrying frame 26 and the second tailgate panel 34.

Within the tailgate system 14, the component-carrying frame 30 can directly support one or more tailgate components, such as a tailgate motor, a torsion rod, a trailer tow module, a step ladder cartridge, a handle assembly, a camera, electrical wiring, sensors, latches, hinges, tailgate cables, etc.

The component-carrying frame 30 may include one or more access openings 125, which can provide access to secure tailgate components to the component-carrying frame 30. In the illustrative example of FIG. 6, latches 128 and tailgate cables 130 are secured to each of the opposed sidewalls 102, the handle assembly 134 is secured to the top wall 106, a tailgate motor 138 is secured to the bottom wall 110, and hinges 142 are secured to the opposed sidewalls 102 and the bottom wall 110. The tailgate components are powered by electrical wiring 146 that passes through the component-carrying frame 30. In this example, the electrical wiring 146 passes through the bottom wall 110 and the cross-member 114 and then divides into multiple sections which connect to the tailgate components. The electrical wiring 146 may include a first section 150 which connects to the handle assembly 134, a second section 154 which connects to one of the latches 128, and a third section 158 which connects to a control module 164.

Figure 5:
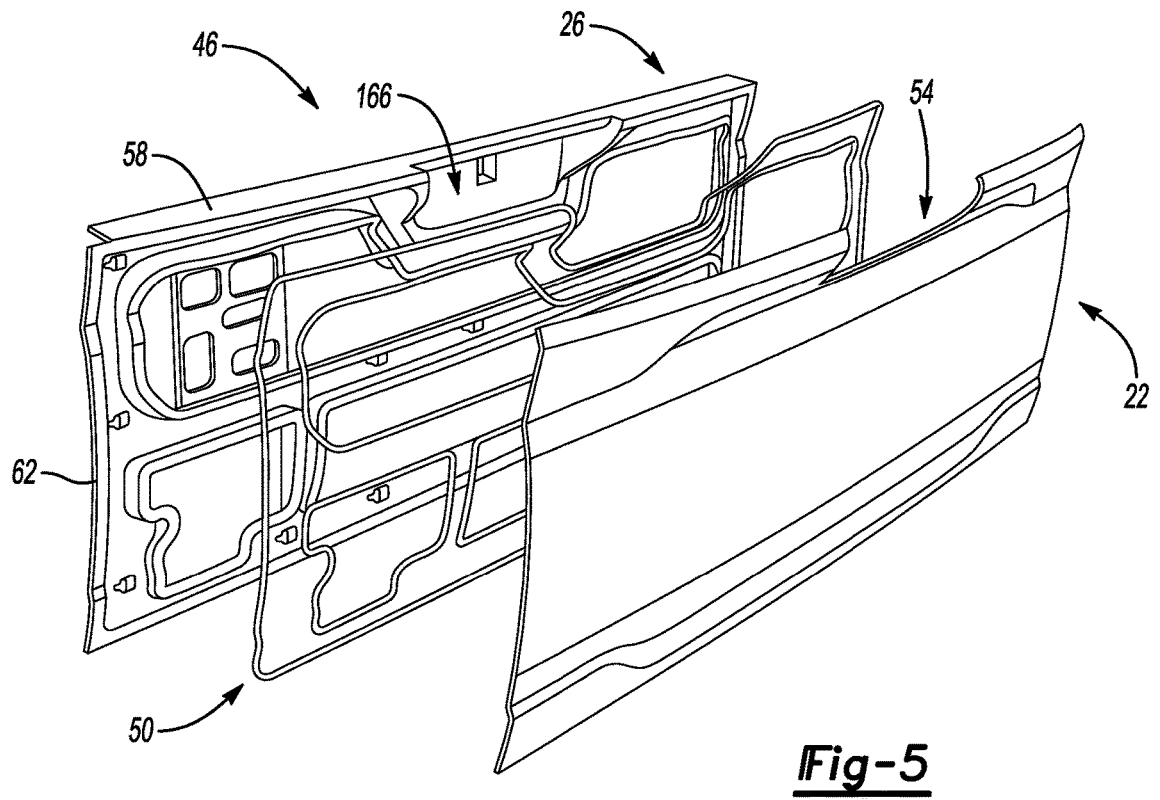
FIG. 5 is an expanded view of the tailgate panel sub-assembly of FIG. 4.
Figure 6:
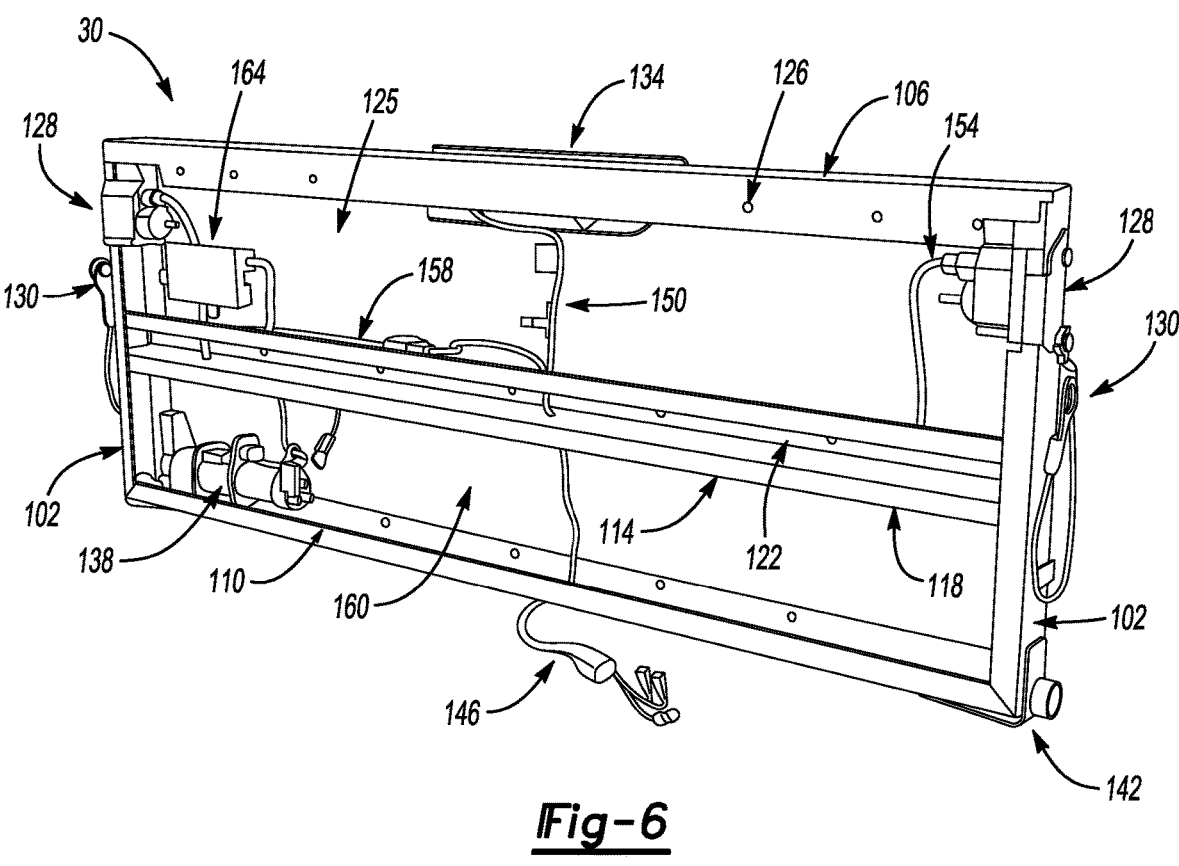
FIG. 6 illustrates a component-carrying frame from the tailgate system of FIG. 2.

In one example, the handle assembly 134 is attached to a recessed area 166 defined on the first side 58 of the panel-carrying frame 26 (see FIG. 5). In another example, the handle assembly 134 is attached to the first side 94 of the component-carrying frame 30.

Figure 4:
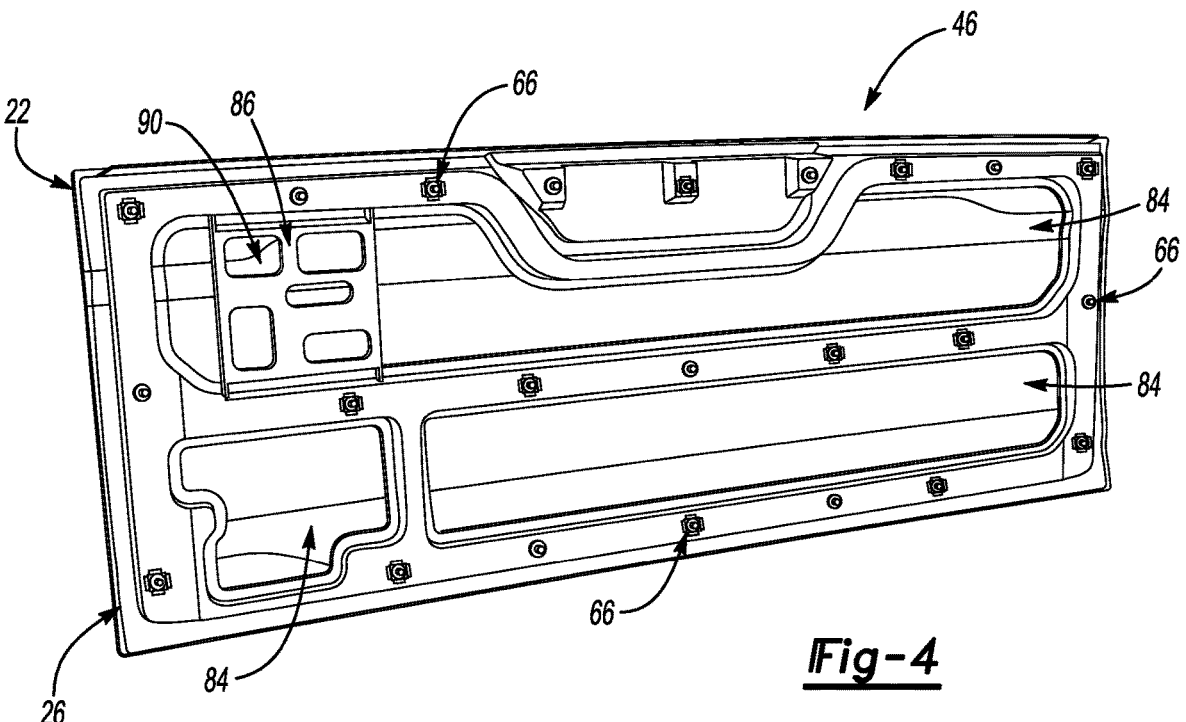
FIG. 4 illustrates a tailgate panel sub-assembly from the tailgate system of FIG. 2.

The control module 164 may be secured to the bracket 86 of the panel-carrying frame 26 (sec FIG. 4). The control module 164 may include both hardware and software and could be part of an overall vehicle control system.

The tailgate motor 138 is secured to the bottom wall 110 by fasteners. The hinges 142 are secured to the opposed sidewalls 102 and the bottom wall 110 by fasteners.

The second tailgate panel 34 is secured directly to the component-carrying frame 30 by fasteners 170 that pass through apertures formed in the second tailgate panel 34. The second tailgate panel 34 includes a first surface 172 and a second surface 176. The first surface 172 is secured directly to the component-carrying frame 30. The second surface 176 can provide a work surface for a user when the tailgate system is in the open position.

The second tailgate panel 34 may be made of a polymer-based material. The second tailgate panel 34 may be painted using powder or spray to decorate the appearance of the tailgate system 14.

The trim panel 38 is secured directly to the component-carrying frame 30. The trim panel 38 is generally U-shaped and includes first and second sections 178, 182 that are secured over the first tailgate panel 22 and the second tailgate panel 34, respectively, by a snap fit, and a third section 186 that is secured directly to the component-carrying frame 30 by one or more fasteners 190.

The trim panel 38 may be made of a polymer-based material. The trim panel 38 may be molded in particular color or painted using powder or spray to decorate the appearance of the tailgate system 14.

FIG. 9 illustrates a flow of an exemplary method 200 of assembling the tailgate system 14. The method 200 begins at step 204 where a tailgate panel, such as the first tailgate panel 22, is secured to the panel-carrying frame 26. The first tailgate panel 22 may be adhesively bonded to the panel-carrying frame 26 to form the tailgate panel sub-assembly 46.

After securing the tailgate panel to the panel-carrying frame 26 at step 204, the method 200 moves to step 208 where the first tailgate panel 22 and the panel-carrying frame 26 are painted with a powder or spray.

After applying paint to the first tailgate panel 22 and the panel-carrying frame 26, the method 200 moves to step 212 where the component-carrying frame 30 is secured to the panel-carrying frame 26. The component-carrying frame 30 may be secured to the panel-carrying frame 26 by fasteners. The component-carrying frame 30 is electrocoated prior to securing the component-carrying frame 30 to the panel-carrying frame 26.

After securing the component-carrying frame 30 to the panel-carrying frame 26, the method 200 moves to step 216 where one or more tailgate components are secured to the component-carrying frame 30. The tailgate components are secured to the component-carrying frame 30 after the component-carrying frame 30 has been electrocoated such that the tailgate components are unpainted.

The method 200 then moves to step 220 where a different tailgate panel, such as the second tailgate panel 34, is secured to the component-carrying frame 30 and then to step 224 where the trim panel 38 is secured to the component-carrying frame 30. The second tailgate panel 34 and the trim panel 38 can be painted with a powder or spray before they are secured to the component-carrying frame 30.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate system assembling method, comprising:
   securing a first tailgate panel to a panel-carrying frame;
   after securing the first tailgate panel to the panel-carrying frame, securing a component-carrying frame to the panel-carrying frame;
   after securing the component-carrying frame to the panel-carrying frame, securing one or more tailgate components to the component-carrying frame; and
   after securing the one or more tailgate components to the component-carrying frame, securing a second tailgate panel to the component-carrying frame such that the tailgate components are held by the component-carrying frame between the first tailgate panel and the second tailgate panel.

2. The tailgate system assembling method of claim 1, wherein securing the first tailgate panel to the panel-carrying frame comprises adhesively bonding the first tailgate panel to the panel-carrying frame.

3. The tailgate system assembling method of claim 1, further comprising painting the first tailgate panel, the panel-carrying frame, or both before securing the panel-carrying frame to the component-carrying frame.

4. The tailgate system assembling method of claim 1, further comprising securing the component-carrying frame to the panel-carrying frame using a plurality of fasteners.

5. The tailgate system assembling method of claim 1, further comprising securing the component-carrying frame to the panel-carrying frame without painting the component-carrying frame.

6. The tailgate system assembling method of claim 1, wherein the tailgate components are unpainted.

7. The tailgate system assembling method of claim 1, further comprising, when securing the tailgate components to the component-carrying frame, accessing the tailgate components through an access opening in the first tailgate panel, an access opening in the panel-carrying frame, an access opening in the component-carrying frame, and any combination thereof.

8. The tailgate system assembling method of claim 1, further comprising, applying paint to the second tailgate panel before securing the second tailgate panel to the component-carrying frame, and further comprising, after securing the second tailgate panel to the component-carrying frame, securing a trim panel to the component-carrying frame.

9. The tailgate system assembling method of claim 1, wherein the panel-carrying frame includes a first side and a second side, the first tailgate panel secured to the first side, the component-carrying frame secured to the second side.

10. A tailgate system, comprising:
a first tailgate panel;
a component-carrying frame;
a panel-carrying frame having a first side and a second side that is opposite the first side, the first tailgate panel directly connected to the first side, the component-carrying frame directly connected to the second side;
a plurality of tailgate components supported on the component-carrying frame; and
a second tailgate panel directly connected to the component-carrying frame such that the tailgate components are held by the component-carrying frame between the first tailgate panel and the second tailgate panel.

11. The tailgate system of claim 10, wherein the first side interfaces directly with the first tailgate panel and the second side interfaces directly with the component-carrying frame.

12. The tailgate system of claim 10, wherein the first tailgate panel and the panel-carrier frame are painted, wherein the component-carrying frame is unpainted.

13. The tailgate system of claim 10, further comprising a plurality of tailgate components that are supported on the component-carrying frame.

14. The tailgate system of claim 13, wherein the plurality of tailgate components includes a tailgate motor, a torsion rod, a trailer tow module, a step ladder cartridge, a handle assembly, a camera, electrical wiring, sensors, latches, hinges, tailgate cables, and any combination thereof.

15. A tailgate system, comprising:
a tailgate panel;
a component-carrying frame; and
a panel-carrying frame having a first side and a second side that is opposite the first side, the tailgate panel directly connected to the first side, the component-carrying frame directly connected to the second side,
wherein the component-carrying frame includes opposed sidewalls that extend between a top wall and a bottom wall, and a cross-member that extends laterally between the opposed sidewalls.

16. The tailgate system of claim 15, wherein each of the opposed sidewalls, the top wall, the bottom wall, and the cross-member include a generally U-shaped channel for receiving tailgate components.

17. The tailgate system of claim 15, wherein the top wall is secured to a trim panel.

18. The tailgate system of claim 10, wherein the panel-carrying frame is sandwiched between the first tailgate panel and the component-carrying frame.

19. The tailgate system assembling method of claim 1, wherein the component-carrying frame includes opposed sidewalls that extend between a top wall and a bottom wall, and a cross-member that extends laterally between the opposed sidewalls, and securing the tailgate components to the component-carrying frame includes securing the tailgate components to the top wall, the bottom wall, the sidewalls, the cross-member, and any combinations thereof.

20. The tailgate system of claim 10, further comprising a trim panel including a a first section secured over the first tailgate panel, a second section secured over the second tailgate panel, and a third section secured directly to the component-carrying frame.

* * * * *